US006805954B2

(12) United States Patent
Silverberg et al.

(10) Patent No.: US 6,805,954 B2
(45) Date of Patent: Oct. 19, 2004

(54) TACKIFIED ACRYLIC PRESSURE SENSITIVE ADHESIVE

(75) Inventors: Eric Silverberg, Clifton, NJ (US); Peter A. Walter, Hampton, NJ (US)

(73) Assignee: National Starch and Chemical Investment Holding Corporaton, New Castle, DE (US)

( * ) Notice: Subject to any disclaimer, the term of this patent is extended or adjusted under 35 U.S.C. 154(b) by 0 days.

(21) Appl. No.: 09/941,162

(22) Filed: Aug. 28, 2001

(65) Prior Publication Data

US 2003/0082373 A1 May 1, 2003

(51) Int. Cl.$^7$ .............................................. B32B 27/30
(52) U.S. Cl. ................ 428/355 AC; 428/343; 524/77; 524/272; 524/764; 525/244
(58) Field of Search .......................... 428/355 AC, 343; 524/77, 272, 764, 457, 458, 461, 529, 533; 525/244, 267; 526/931

(56) References Cited

U.S. PATENT DOCUMENTS

| | | | |
|---|---|---|---|
| 4,087,392 A | * | 5/1978 | Hartmann et al. ............ 260/24 |
| 4,645,711 A | | 2/1987 | Winslow et al. |
| 4,654,389 A | | 3/1987 | Graham et al. |
| 4,939,190 A | | 7/1990 | Tomioka et al. |
| 5,639,811 A | | 6/1997 | Plamthottam et al. |
| 5,723,191 A | | 3/1998 | Plamthottam et al. |
| 5,874,143 A | | 2/1999 | Peloquin et al. |
| 6,288,148 B1 | * | 9/2001 | Samukawa et al. ........... 524/77 |
| 6,350,514 B1 | * | 2/2002 | Venderbosch ............ 428/319.7 |

OTHER PUBLICATIONS

JP 01079281, English Abstract, Mar. 24,1989.*
JP 01016882, English Abstract, Jan. 20, 1989.*
JP 2000096020, English Abstract Apr. 4, 2000, Japan.
JP 09279113, English Abstract, Oct. 28, 1997, Japan.
JP 07026227, English Abstract, Jan. 27, 1995, Japan.
Hyun–Joong Kim and Hiroshi Mizumachi, "Miscibility and Peel Strength of Acrylic Pressure–Sensitive Adhesives: Acrylic Copolymer–Tackifier Resin Systems", Journal of Applied Polymer Science, vol. 56, 201–209 (1995).

* cited by examiner

Primary Examiner—David J. Buttner
Assistant Examiner—Christopher Keehan
(74) Attorney, Agent, or Firm—Cynthia L. Foulke

(57) ABSTRACT

Pressure sensitive adhesive formulations comprising an acrylic copolymer and a mixture of tackifiers exhibit outstanding adhesion to foam facestocks.

14 Claims, 1 Drawing Sheet

TACKIFIED ACRYLIC PRESSURE SENSITIVE ADHESIVE

FIELD OF THE INVENTION

The invention relates to pressure sensitive adhesive formulations. In particular, the invention relates to a pressure sensitive adhesive formulation comprising an acrylic polymer and a mixture of at least two substantially different tackifiers.

BACKGROUND OF THE INVENTION

Typical acrylic pressure sensitive adhesive formulations are copolymers of alkyl ester monomers, a functional monomer such as acrylic acid, and may be crosslinked using, for example, aluminum chelates. While these adhesives are inherently tacky, they are generally deficient in adhesion to low energy surfaces. It is known in the art that adhesives may be tackified with e.g., rosin esters to improve low surface energy adhesion. Such tackification, however, typically results in loss of heat resistance. Furthermore, prior art tackified adhesives are deficient in anchorage to many tape backings.

There remains a need for improved polymer compositions which can be used to prepare pressure sensitive adhesives having sufficient adhesion to a variety of backing materials, particularly foam, and adhere to a wide variety of substrates, including low energy surfaces, while maintaining performance properties. The present invention addresses this need.

SUMMARY OF THE INVENTION

The invention provides adhesive formulations that exhibit very good adhesion to foam facestocks that are traditionally hard to bond and adhere to a wide variety of substrates, including low energy surfaces, while maintaining performance properties. The adhesives give unexpectedly high peel and tack at room and elevated temperatures.

One aspect of the invention is directed to a pressure-sensitive adhesive comprising an acrylic polymer and a mixture of at least two substantially different tackifiers. The tackifiers useful in the practice of the invention include at least one tackifier having a softening point of greater than about 60° C. and at least another tackifier having a softening point of less than about 40° C. In a preferred embodiment of the invention the adhesive comprises at least one rosin ester and at least one phenolic modified terpene.

In one embodiment, the adhesive comprises an acrylic polymer comprising at least one low glass transition temperature (Tg) alkyl acrylate monomer containing from about 4 to about 18 carbon atoms in the alkyl group. The acrylic polymer may optionally comprise other monomers, including monomers having a high glass transition temperature and/or functional monomers. The acrylic polymer may, preferably, also comprise a crosslinking agent.

In a particularly preferred embodiment, the adhesive comprises an acrylic polymer comprising 2-ethylhexyl acrylate, methyl acrylate, acrylic acid, and a crosslinking agent tackified with a mixture of a rosin ester and phenolic modified terpene.

Yet another aspect of the invention is directed to adhesive articles, e.g., industrial tapes, transfer films, and the like, comprising a pressure sensitive adhesive comprising a mixture of at least two substantially different tackifiers.

BRIEF DESCRIPTION OF THE DRAWING

The drawing FIGURE shows that addition of terpene phenols increases the storage modulus.

DETAILED DESCRIPTION OF THE INVENTION

Figure 1:
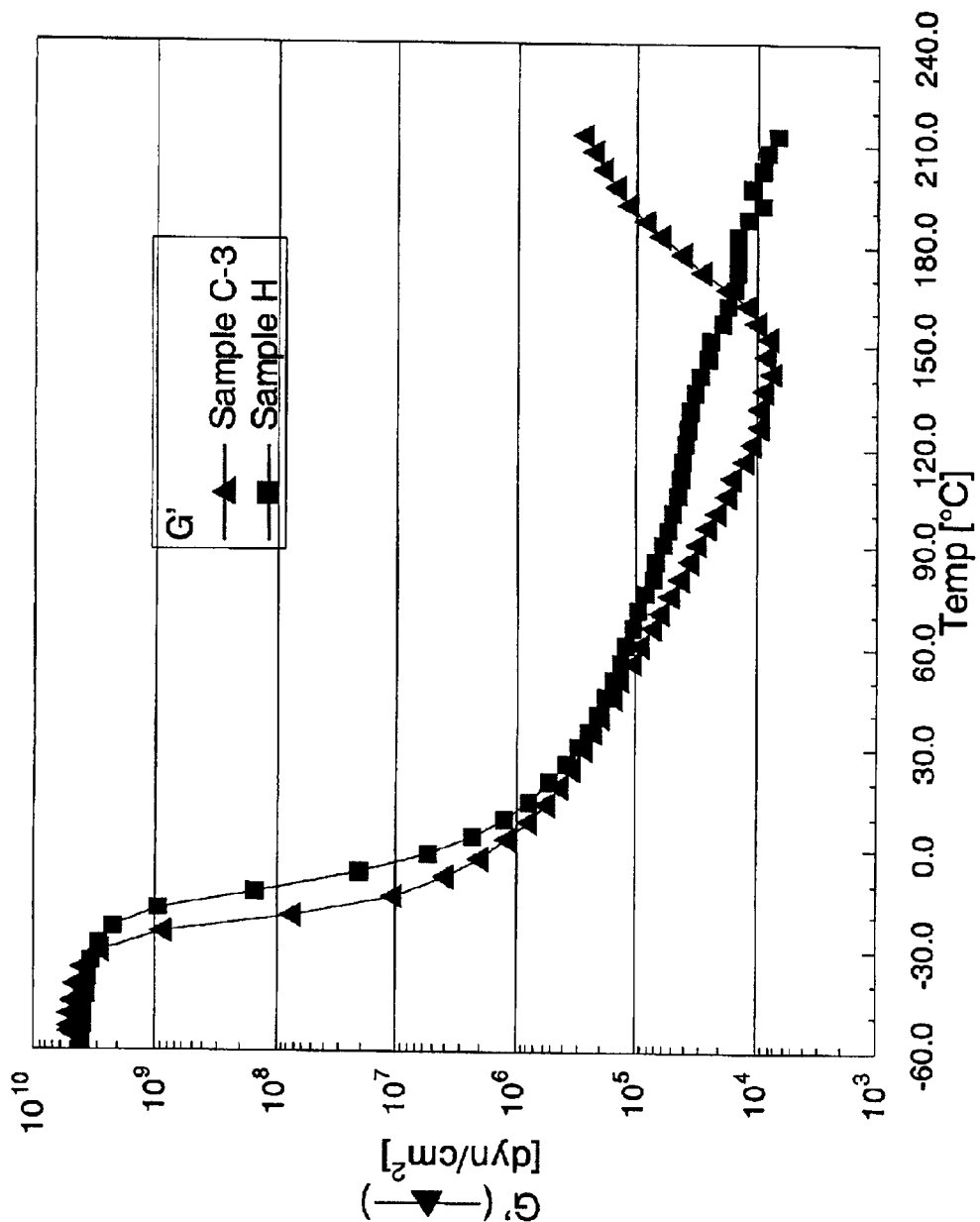

As used herein, the term "pressure-sensitive adhesive" refers to a viscoelastic material which adheres instantaneously to most substrates with the application of slight pressure and remains permanently tacky.

The pressure-sensitive adhesive of the invention is a tackified acrylic polymer. The adhesive comprises an acrylic polymer and a mixture of at least two substantially different tackifiers. By at least two "substantially different" tackifiers means that the mixture contains at least two tackifiers that differ in chemical nature as well as softening point.

The adhesive compositions of this invention are tackified and the specific mixture of tackifiers used is critical to the practice of the invention. The tackifying mixture will contain at least one tackifier having a softening point of greater than about 60° C. and at least another tackifier having a softening point of less than about 40° C. Tackifiers for use in the practice of the invention may be solid or liquid.

Preferred low softening point (i.e., having a softening point of less than about 40° C.) tackifiers are rosin ester tackifiers. The rosin ester is chosen to have a low softening point and be compatible with the copolymer. Commercially available rosin ester tackifiers include Sylvalite RE 10L and Sylvatac 40N.

Preferred high softening point (i.e., having a softening point of more than about 60° C.) tackifiers are phenolic modified terpene tackifiers. The terpene tackifier is chosen to have a high softening point and a phenol content to make it sufficiently compatible with the copolymer. Commercially available phenolic modified terpene tackifiers include Sylvares TP-300, Sylvares TP-2040, Sylvares TP-2019 and Sylvares TP-7042.

In the practice of the invention, the tackifying agents will typically be present at a level of from about 20 to about 50% by weight of the adhesive composition, more preferably from about 25 to about 45% by weight of the adhesive composition, on a dry weight basis. The low softening point tackifier is preferably present in an amount of at least about 5% of the total tackifier, and preferably comprises from about 20% to about 35% of the total tackifier present in the adhesive composition.

Use of a mixture of high and low softening point tackifiers raises the modulus, as shown in FIG. 1, and improves anchorage to foam while maintaining performance properties (i.e., high peel and tack) as shown in the Examples.

The composition of the tackified adhesive composition is adjusted to have a Tg of less that about −10° C., preferably from about −10° C. to about −30° C.

The acrylic polymer contemplated for use in the practice of the invention is formed of acrylate monomers of one or more low Tg alkyl acrylates. Low Tg monomers are those having a homopolymer Tg of less than about 0° C. Preferred alkyl acrylates which may be used to practice the invention have up to about 18 carbon atoms in the alkyl group, preferably from about 4 to about 10 carbon atoms in the alkyl group. Particularly preferred are butyl acrylate, 2-ethyl hexyl acrylate and/or isooctyl acrylate.

The acrylic copolymer may optionally further comprise other well known comonomers including monomers having a high glass transition temperature (i.e., a Tg greater than about 0° C). Non-limiting examples include methyl acrylate, ethyl acrylate, isobutyl methacrylate, and/or vinyl acetate.

The acrylic polymer may also comprise one or more functional monomers. Preferred are carboxy and/or hydroxy functional monomers. Useful carboxylic acids preferably contain from about 3 to about 5 carbon atoms and include, among others, acrylic acid, methacrylic acid, itaconic acid, and the like. Acrylic acid, methacrylic acid and mixtures thereof are particularly preferred. Examples of hydroxy functional monomers include hydroxyethyl acrylate, hydroxypropyl acrylate, hydroxyethyl methacrylate and hydroxypropyl methacrylate. Hydroxy and/or carboxy functional monomers are generally used in an amount of from about 1 to about 15%, preferably from about 3 to about 10%.

Other comonomers can be used to modify the Tg of the acrylic polymer, to further enhance adhesion to various surfaces and/or to further enhance high temperature shear properties. Such comonomers include N-vinyl pyrrolidone, N-vinyl caprolactam, N-alkyl (meth)acrylamides such as t-octyl acrylamide, cyanoethylacrylates, diacetoneacrylamide, N-vinyl acetamide, N-vinyl formamide, glycidyl methacrylate and allyl glycidyl ether.

The monomer proportions of the acrylic polymer are adjusted in such a way that the copolymer has a glass transition temperature of less than about $-20°$ C., preferably from about $-25°$ C. to about $-40°$ C.

The preferred adhesive compositions are preferably formulated with a crosslinking agent. Preferred are chemical crosslinking agents. Use of aluminum and titanium crosslinking agents may be used to practice the invention. Non-limiting examples include aluminum tris (acetylacetonate) and bis (2,4-pentanedionate-0,0') bis (2-propanolato) titanium. Use of a crosslinker adds to the cohesive strength and helps in the high temperature performance. The crosslinker is typically added in an amount of from about 0.3% to about 2% by weight of the acrylic copolymer.

The acrylic polymers used to prepare the adhesives of the invention will preferable have a weight average molecular weight of greater that 400,000, more preferably more than about 500,000.

The formulated adhesive may also include, excipients, diluents, emollients, plasticizers, antioxidants, anti-irritants, opacifiers, fillers, such as clay and silica, pigments and mixtures thereof, preservatives, as well as other components or additives.

The pressure sensitive adhesives of the invention may advantageously be used in the manufacture of adhesive articles including, but not limited to, industrial tapes and transfer films. The adhesive articles are useful over a wide temperature range and adhere to a wide variety of substrates, including low energy surfaces, such as polyolefins, e.g., polyethylene and polypropylene, polyvinyl fluoride, ethylene vinyl acetate, acetal, polystyrene, powder-coated paints, and the like. Single and double face tapes, as well as supported and unsupported free films are encompassed by the invention. Also included, without limitation, are labels, decals, name plates, decorative and reflective materials, reclosable fasteners, theft prevention and anti-counterfeit devices.

In one embodiment, the adhesive article comprises an adhesive coated on at least one major surface of a backing having a first and second major surface. Useful backing substrates include, but are not limited to paper, foam, metal, fabric, and various polymer films such as polypropylene, polyamide and polyester. In a preferred embodiment of the invention the substrate is foam, more preferably a polyurethane foam. The adhesive may be present on one or both surfaces of the backing. When the adhesive is coated on both surfaces of the backing, the adhesive on each surface can be the same or different.

The invention is further illustrated by the following non-limiting examples.

EXAMPLES

In the following examples, the following adhesive test methods were used.

Preparation of Coatings

The acrylic polymer used to prepare the adhesives exemplified herein comprise, unless otherwise indicated, 65% 2-ethylhexyl acrylate, 27.5% methyl acrylate, 7.5% acrylic acid. The amount of aluminum tris(acetylacetonate) is denoted in the Tables. The type and amount of specific tackifier(s) is denoted in the Tables.

The adhesive solutions were cast on a silicone coated release liner, air dried for 15 minutes, then dried for 3 minutes at 250° F. in a forced air oven. The films were then laminated to a backing film and conditioned overnight at 22° C. and 50% relative humidity. Unless otherwise indicated the dried adhesive film thickness was 3.5 mil (dry) and the backing film was 2 mil polyethylene terephthalate film.

Peel Adhesion

Peel adhesion at 180° between the backing and the adherend test panel was measured according to Test Method number 1 of the Pressure Sensitive Tape Council (PSTC), Northbrook, Ill., adapted as follows. The peel strength was measured after wetting out a stainless steel panel for 20 minutes or as otherwise indicated. Unless otherwise indicated, all testing was performed at 22° C. and 50% relative humidity. The result reported is the average of three measurements.

Shear Holding Power

Shear holding power was measured according to PSTC Test Method number 7, adapted as follows. The holding power was measured under a shear load of 500 g on a 0.5 inch by 1 inch area, applied after wetting out the stainless steel test panel for 15 minutes. Unless otherwise indicated, all testing was performed at 22° C. and 50% relative humidity. The result reported is the average of three measurements.

Mandrel Test for Anchorage

The mandrel test is designed to test the interface between the backing material and the adhesive (i.e., delamination of adhesive from the backing material) at room temperature and elevated temperatures. The mandrel used in this test may be made of any type of material to which the adhesive adheres firmly.

The mandrel test for anchorage measurement was performed by placing a 1 inch by 6 inch foam tape specimen around a mandrel of 2.5 inch diameter. The specimen was allowed to wet out the mandrel for 2 hrs (or longer where noted) at room temperature before placing the entire construction in to a 120° F. oven. The sample remained at 120° F. for 2 hrs and then the sample was evaluated for flagging (lifting at the ends of the strips). The temperature was then increased 20° F. and again evaluated for flagging. This continued every 2 hrs. A specimen is considered a failure if the tape flags more than ½" on each side. The temperature at which failure occurs as well as the amount of flagging is reported.

Example 1

Comparative Samples C-1, C-2 and C-3 were prepared using only low softening point tackifier. The adhesive properties of these samples were tested. Results are shown in Table 1.

TABLE 1

| Sample | C-1 | C-2 | C-3 |
|---|---|---|---|
| Polymer (dry basis) | 83.06% | 71.23% | 62.34% |
| Sylvalite RE 10L | 16.61% | 28.49% | 37.41% |
| Sylvares TP 300 | 0% | 0% | 0% |
| Al(acac)$_3$ crosslinker | 0.33% | 0.28% | 0.25% |
| Peel (oz/in) 20 Min. | 70 AF | 114 10% Tr. | 132 CF |
| Peel (oz/in) 24 Hr | 114.0 2% Tr. | 112.0 CF | 133 CF |
| Shear (Hr) | 0.54 CF | 0.18 CF | 0.11 CF |
| Mandrel Test | | | |
| R.T. - 24 Hrs. | Fail/3" Open/* | Fail/3-5/8" Open/CF | Fail/3-5/8" Open/CF |

*Delamination of adhesive from foam
CF = Cohesive Failure
AF = Adhesive Failure
Tr. = Transfer This example shows that when only low softening point tackifier is used, the adhesives fail the mandrel test. They exhibit a failure in either anchorage or cohesion at the adhesive-foam interface.

Example 2

Comparative Sample C-4 was prepared using only high softening point tackifier. The adhesive properties of this sample was tested. Results are shown in Table 2.

TABLE 2

| Sample | C-4 |
|---|---|
| Polymer (dry basis) | 78.49% |
| Sylvalite RE 10L | 0% |
| Sylvares TP 300 | 21.19% |
| Al(acac)$_3$ crosslinker | 0.31% |
| Peel (oz/in) 20 Min. | 146 CF |
| Peel (oz/in) 24 Hr | 156 CF |
| Shear (Hr) | >400 |
| Mandrel Test | |
| R.T. - 24 Hrs. | Fail/2" Open/*. |

*Delamination of adhesive from foam
CF = Cohesive Failure
AF = Adhesive Failure
Tr. = Transfer This example shows that the adhesive fails to adhere to the backing when only high softening point tackifier is used.

Example 3

Samples A-G containing both a low softening point tackifier and a high softening point tackifier were prepared. The adhesive properties of these samples were tested. Results are shown in Table 3.

TABLE 3

| Sample | A | B | C | D | E | F | G |
|---|---|---|---|---|---|---|---|
| Polymer (dry basis) | 76.8% | 58.66% | 76.66% | 58.57% | 71.28% | 66.53% | 62.38% |
| Sylvalite RE 10L | 7.68% | 29.50% | 7.67% | 29.45% | 21.38% | 19.96% | 18.71% |
| Slyvares TP 300 | 15.36% | 11.73% | 15.33% | 11.71% | 7.13% | 13.31% | 18.71% |
| Al(acac)$_3$ Crosslinker | 0.15% | 0.12% | 0.34% | 0.26% | 0.21% | 0.20% | 0.19% |
| Peel (oz/in) 20 Min. | 89 AF | 111 AF | 86 AF | 93 AF | 91 AF | 99 AF | 103 AF |
| Peel (oz/in) 24 Hr | 103 AF | 123 CF | 98 AF | 108 1% Tr. | 96 AF | 109 AF | 116 5% Tr |
| Shear (Hr) | 35 CF | 2.1 CF | 73 Hrs. + 1/8" creep | 73 Hrs. + 1/2" creep | 42.6 CF | 15.8 CF | 8.4 CF |
| Mandrel Test | | | | | | | |
| R.T. - 2 Hrs. | Pass/0" | Pass/0" | Pass/0" | Pass/0" | Pass/0" | Pass/0" | Pass/0" |
| 120° F. - 2 Hrs. | Pass/1/8"/*3 | Pass/3/16"/*3 | Pass/1/8"/*3 | Pass/1/8"/*3 | Pass/1/8"/*3 | Pass/1/8"/*3 | Pass/1/8"/*3 |
| 140° F. - 2 Hrs. | Pass/1/4"/*3 | Pass/3/8"/*3 | Pass/1/8"/*3 | Pass/1/8"/*3 | Pass/1/8"/*3 | Pass/1/8"/*3 | Pass/3/16"/*3 |
| 160° F. - 2 Hrs. | Pass/3/8"/*2 | Pass/11/16"/*3 | Pass/1/8"/*3 | Pass/3/16"/*3 | Pass/1/8"/*3 | Pass/1/4"/*3 | Pass/1/4"/*3 |
| 180° FC. - 2 Hrs. | Fail/1-1/16"/*2 | Fail/1-1/4"/*3 | Pass/1/8"/*3 | Pass/1/4"/*3 | Pass/1/4"/*3 | Pass/1/4"/*3 | Pass/3/8"/*3 |
| 200° F. - 2 Hrs. | Fail/1-1/8"/*2 | Fail/1-3/4"/*3 | Pass/3/16"/*3 | Pass/1/4"/*3 | Pass/3/8"/*3 | Pass/3/8"/*3 | Pass/7/16"/*3 |
| 225° F. - 2 Hrs. | Fail/1-3/4"/*2 | Fail/2-1/2"/*3 | Pass/7/16"/*3 | Pass/1/4"/*3 | Pass/9/16"/*3 | Pass/1/2"/*3 | Pass/3/4"/*3 |
| 300° F. - 2 Hrs. | Fail/2-3/4"/*2 | Fail/3"/*2 | Fail/1-1/4"/*2 | Pass/1/2"/*3 | Fail/1-1/4"/*2 | Fail/1-3/8"/*2 | Fail/1-7/8"/*2 |

Flagging/Max. = 1" from the mandrel/ 1/2" each side
Failure Mode
*1. Adhesive failure from mandrel
*2. Adhesive transfer to mandrel
*3. Cohesive split between mandrel and foam The adhesives of the invention show very good adhesion to foam and exhibit high peel and tack at room and elevated temperatures.

Example 4

Comparative Sample C-5 was prepared using only low softening point tackifier, but excess amount of crosslinker. This sample was compared to Sample H that contains both low and high softening point tackifiers. Results are shown in Table 4.

TABLE 4

| Sample | C-5 | Sample H |
|---|---|---|
| Polymer (dry basis) | 62.30% | 55.43% |
| Sylvalite RE 10L | 37.38% | 33.26% |
| Sylvares TP 300 | 0% | 11.09% |
| Al(acac)3 Crosslinker | 0.32% | 0.22% |
| Peel (oz/in) 20 Min. | 64 AF | 108 AF |
| Peel (oz/in) 24 Hr | 65 AF | 113 Tr. |
| Shear (Hr) | >66 | >66 |
| Mandrel Test | | |
| R.T. - 24 Hrs. | Pass | Pass |
| 158° F. - 24 Hrs. | Pass/3/32" Open | Pass/3/32" Open |
| 200° F. - 24 Hrs. | Pass/1/8" Open/** | Pass/1/4" Open/** |
| 225° F. - 24 Hrs. | Pass/5/8" Open/** | Pass/5/16" Open/** |
| 250° F. -8 Hrs. | Pass/29/32" Open/** | Pass/5/16" Open/** |

** = Stringy adhesive
CF = Cohexive Failure
AF = Adhesive Failure
Tr. = Transfer This example shows that use of a crosslinking agent improves cohesion as expected and provides anchorage to foam backing, but exhibits an unacceptable reduction in peel strength.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A pressure-sensitive adhesive composition comprising an acrylic copolymer and at least two substantially different tackifiers wherein at least one tackifier is a terpene phenolic tackifier having a softening point of greater than about 60° C. and at least another tackifier is a rosin ester tackifiers having a softening point of less than about 40° C.

2. The adhesive of claim 1 wherein the adhesive has a glass transition temperature of from about −20° C. to about −30° C.

3. The adhesive of claim 1 wherein the copolymer is crosslinked using a crosslinking agent.

4. The adhesive of claim 1 wherein the acrylic copolymer comprises at least one alkyl acrylate monomer containing from about 4 to about 18 carbon atoms in the alkyl group.

5. The adhesive of claim 4 wherein the copolymer further comprises at least one hydroxy functional monomer and/or at least one carboxy functional monomer.

6. The adhesive of claim 4 wherein the copolymer comprises 2-ethyl hexyl acrylate.

7. The adhesive of claim 4 wherein the copolymer further comprises methyl acrylate.

8. The adhesive of claim 4 wherein the copolymer further comprises acrylic acid.

9. An article of manufacture comprising the adhesive of claim 1.

10. The article of claim 9 which is a pressure sensitive adhesive tape.

11. The article of claim 9 which is a label.

12. The adhesive tape of claim 10 comprising a polymeric backing, wherein the adhesive is applied to a surface of said backing.

13. The tape of claim 12 wherein the backing comprises a polyurethane foam.

14. The tape of claim 13 wherein the adhesive is applied to both sides of said backing.

* * * * *